US011713013B2

(12) United States Patent
Watson (10) Patent No.: US 11,713,013 B2
(45) Date of Patent: Aug. 1, 2023

(54) SIDE UNDERRIDE GUARD ASSEMBLY FOR A TRAILER

(71) Applicant: Fontaine Commercial Trailer, Inc., Haleyville, AL (US)

(72) Inventor: Michael H. Watson, Phil Campbell, AL (US)

(73) Assignee: Fontaine Commercial Trailer, Inc., Haleyville, AL (US)

( * ) Notice: Subject to any disclaimer, the term of this patent is extended or adjusted under 35 U.S.C. 154(b) by 76 days.

(21) Appl. No.: 17/369,076

(22) Filed: Jul. 7, 2021

(65) Prior Publication Data

US 2022/0009436 A1 Jan. 13, 2022

Related U.S. Application Data

(60) Provisional application No. 63/049,722, filed on Jul. 9, 2020.

(51) Int. Cl.
*B60R 19/54* (2006.01)

(52) U.S. Cl.
CPC .................................. *B60R 19/54* (2013.01)

(58) Field of Classification Search
CPC ....... B60R 19/54; B60R 19/56; B60R 19/565; B60R 19/42; B60R 19/26
USPC ................. 293/124, 126, 127, 128
See application file for complete search history.

(56) References Cited

U.S. PATENT DOCUMENTS

| 4,060,268 | A | * | 11/1977 | Page, Jr. ............... B60R 19/565 |
| | | | | 293/128 |
| 6,402,209 | B2 | | 6/2002 | McGuiness |
| 6,604,765 | B1 | | 8/2003 | Eull |
| 6,799,783 | B2 | | 10/2004 | Gollungberg et al. |
| 6,969,106 | B1 | | 11/2005 | Hankel |
| 6,971,690 | B2 | | 12/2005 | Evans et al. |
| 7,086,674 | B2 | | 8/2006 | Goertz |
| 7,093,889 | B2 | | 8/2006 | Graham |
| 7,404,592 | B1 | | 7/2008 | Reiman et al. |

(Continued)

FOREIGN PATENT DOCUMENTS

| CA | 2624482 A1 | 10/2009 |
| CA | 2528558 C | 4/2013 |

(Continued)

*Primary Examiner* — Joseph D. Pape
*Assistant Examiner* — Veronica M Shull
(74) *Attorney, Agent, or Firm* — Andrus Intellectual Property Law, LLP (57) ABSTRACT

A side underride guard assembly for a trailer has a plurality of support subassemblies coupled to first and second longitudinal main beams of the trailer. Each support subassembly has at least one cross member having a first end adjacent a first longitudinal side edge of the trailer and an opposite second end adjacent an opposite second longitudinal side edge of the trailer. Each support subassembly also has at least one vertically oriented plate coupled to the at least one cross member. A first longitudinal guard member is coupled to the first end of each of the cross members of the plurality of support subassemblies. A second longitudinal guard member is coupled to the second end of each of the cross members. The first and second longitudinal guard members are located below the first and second longitudinal side edges of the trailer, respectively, to prevent or inhibit side underride.

17 Claims, 9 Drawing Sheets

(56) References Cited

U.S. PATENT DOCUMENTS

| | | |
|---|---|---|
| 7,407,204 B2 | 8/2008 | Eriksson et al. |
| 7,530,612 B2 | 5/2009 | Regnell et al. |
| 7,578,541 B2 | 8/2009 | Layfield et al. |
| 7,686,385 B2 | 3/2010 | Dolan et al. |
| 7,766,403 B2 | 8/2010 | Alvarsson et al. |
| 7,780,224 B2 | 8/2010 | Roush |
| 7,938,475 B2 * | 5/2011 | Boivin .................. B60R 19/565 296/180.4 |
| 7,967,349 B2 | 6/2011 | Puppini et al. |
| 8,162,384 B2 | 4/2012 | Giromini et al. |
| 8,186,745 B2 | 5/2012 | Graham et al. |
| 8,191,956 B1 | 6/2012 | Dixon et al. |
| 8,210,599 B2 | 7/2012 | Butler |
| 8,366,180 B2 | 2/2013 | Lee et al. |
| 8,678,474 B1 | 3/2014 | Boivin et al. |
| 8,814,252 B2 | 8/2014 | Song |
| 8,857,893 B2 | 10/2014 | Reiman et al. |
| 8,950,793 B2 | 2/2015 | Deighton |
| 8,973,973 B2 | 3/2015 | Kronemeyer |
| 9,199,594 B2 | 12/2015 | Musale et al. |
| 9,199,676 B2 | 12/2015 | Brown et al. |
| 9,272,741 B2 | 3/2016 | Gerst |
| 9,340,240 B2 | 5/2016 | Clark |
| 9,352,714 B2 | 5/2016 | Batzer et al. |
| 9,463,759 B1 | 10/2016 | Kiefer |
| 9,487,171 B2 * | 11/2016 | Rogers .................. B60R 19/565 |
| 9,669,883 B2 | 6/2017 | Bassily et al. |
| 9,688,320 B2 | 6/2017 | Courtney et al. |
| 9,840,219 B2 | 12/2017 | Theethira Kushalappa et al. |
| 9,908,493 B1 | 3/2018 | Kiefer |
| 9,919,749 B2 | 3/2018 | Baker et al. |
| 9,919,750 B2 | 3/2018 | Baker et al. |
| 10,081,397 B2 | 9/2018 | Bacon |
| 10,173,620 B2 | 1/2019 | Tang et al. |
| 10,259,414 B2 | 4/2019 | Keane et al. |
| 10,343,636 B2 | 7/2019 | Fortier |
| 10,343,731 B2 | 7/2019 | Emery et al. |
| 10,370,039 B2 | 8/2019 | Geary et al. |
| 10,549,797 B2 | 2/2020 | Ehrlich et al. |
| 10,632,948 B2 | 4/2020 | Roush et al. |
| 10,676,055 B2 | 6/2020 | Kim et al. |
| 10,710,648 B2 | 7/2020 | Macherel et al. |
| 10,940,817 B2 * | 3/2021 | Kunkel ................ B62D 35/008 |
| 2008/0116702 A1 * | 5/2008 | Enz ........................ B60R 19/56 293/128 |
| 2011/0233960 A1 | 9/2011 | Heinz |
| 2012/0319428 A1 | 12/2012 | Wood |
| 2014/0159419 A1 | 6/2014 | Baker et al. |
| 2016/0001827 A1 | 1/2016 | Reiman et al. |
| 2018/0118143 A1 | 5/2018 | Ponder |
| 2018/0244228 A1 | 8/2018 | Desjardins |
| 2019/0077470 A1 | 3/2019 | Kunkel et al. |
| 2019/0184924 A1 | 6/2019 | Mikazuki et al. |
| 2019/0225173 A1 | 7/2019 | Byrne |
| 2019/0256026 A1 | 8/2019 | Kunkel et al. |
| 2019/0283812 A1 | 9/2019 | Grandominico et al. |
| 2019/0308675 A1 | 10/2019 | Miyakawa |
| 2019/0337576 A1 | 11/2019 | Brereton et al. |
| 2019/0359156 A1 | 11/2019 | Deighton |
| 2020/0039587 A1 | 2/2020 | Bradley |
| 2020/0130619 A1 | 4/2020 | Harrison |
| 2020/0223497 A1 | 7/2020 | Boivin et al. |
| 2020/0231226 A1 | 7/2020 | Senatro et al. |
| 2020/0377046 A1 | 12/2020 | Hashimura et al. |
| 2020/0406988 A1 | 12/2020 | Bradley et al. |

FOREIGN PATENT DOCUMENTS

| | | |
|---|---|---|
| WO | WO 2004062953 A2 | 7/2004 |
| WO | WO 2005085009 A1 | 9/2005 |
| WO | WO 2007115572 A1 | 10/2007 |
| WO | WO 2008002212 A1 | 1/2008 |
| WO | WO 2009051551 A1 | 4/2009 |
| WO | WO 2009080187 A1 | 1/2010 |
| WO | WO 2010086888 A2 | 10/2010 |
| WO | WO 2013091232 A1 | 6/2013 |
| WO | WO 2013092223 A1 | 6/2013 |
| WO | WO 2014083376 A1 | 6/2014 |
| WO | WO 2015080086 A1 | 6/2015 |
| WO | WO 2017191595 A1 | 11/2017 |
| WO | WO 2017207896 A1 | 12/2017 |

* cited by examiner

SIDE UNDERRIDE GUARD ASSEMBLY FOR A TRAILER

CROSS-REFERENCE TO RELATED APPLICATION

This application claims the benefit of U.S. Provisional Application Ser. No. 63/049,722, filed Jul. 9, 2020, the entirety of which is hereby incorporated by reference herein.

FIELD

The present disclosure relates to semi-trailers, and more specifically to side underride guard assemblies for preventing or inhibiting a vehicle from riding under the side of such trailers in the event of a side-impact collision.

BACKGROUND

U.S. Pat. No. 7,780,224 discloses an aerodynamic underride guard comprising an angled front section located ahead of the trailer landing gear, a crash attenuating middle section located between the trailer landing gear and the trailer wheel assembly, and an angled rear section located in proximity to the trailer wheel assembly. The front angled section deflects air away from the non-aerodynamic features of the trailer landing gear. The rear angled section deflects air away from the non-aerodynamic features of the trailer wheel assembly, and the crash attenuating middle section can prevent vehicles from under riding the trailer.

U.S. Pat. No. 10,549,797 discloses a side underride system configured to be coupled to a trailer, which may comprise a first skirt wall coupled to the trailer, positioned below a first side wall of the trailer, and extending along a first length of the trailer between a skirt wall front end and a skirt wall rear end and a cable system including a first cable coupled to the trailer, positioned below the first side wall, and extending along a second length of the trailer between a cable system front end and a cable system rear end, the skirt wall rear end being positioned forward of the cable system rear end.

U.S. Pat. No. 10,632,948 discloses a guard for a trailer that utilizes a strap webbing to prevent a vehicle from underriding the trailer. The guard includes one or more straps that span the length of the trailer and may include additional structures to pre-tension the straps before a crash or supplement the tension of the straps as a vehicle crashes into the guard. When two or more straps are utilized on a single guard, the straps may be aligned parallel to each other or may form a cross shape. Additional structures may be incorporated into the guard to direct an impacting vehicle towards or away from specific features of the trailer.

U.S. Patent Application Publication No. 2018/0118143 discloses a side underride guard for attachment to the underside of a trailer comprising two guard rails longitudinally positioned below the outer sides of the trailer, with each guard rail attached to the trailer by a plurality of vertical support members and with the two guard rails attached to each other and the trailer by a plurality of diagonal support members. The side underride guard further supports and incorporates an aero skirt for reducing trailer drag.

U.S. Patent Application Publication No. 2019/0077470 discloses a side underride system configured to be coupled to a trailer. The side underride system includes a support system, including a brace system and a cable, configured to be positioned below the trailer to provide side underride protection. The brace system includes a plurality of cross-braces that each extend across a width of the trailer and are spaced apart at intervals along a length of the trailer. The cable is configured to extend across the intervals between the cross-braces.

U.S. Patent Application Publication No. 2019/0256026 discloses a side underride system configured to be coupled to a trailer. The side underride system comprises a support system configured to be positioned below the trailer to provide side underride protection. The support system includes a cable system and a brace system. The cable system is configured to couple to the trailer. The brace system includes a plurality of cross-braces that each extend at least partially across a width of the trailer, are spaced apart at intervals along a length of the trailer, and are configured to capture the cable system.

WO 2010/120985 discloses a side skirt system for reducing drag on a trailer including a side skirt wall configured to be coupled to one side of the trailer to extend below a side wall of the trailer along a length of the trailer. A mounting bracket assembly of the system is coupled to the side skirt wall and is configured to be coupled to a floor assembly of the trailer. The mounting bracket assembly is configured to tilt laterally outwardly and laterally inwardly with respect to a generally vertical axis parallel to the side wall of the trailer. A side underride cable system configured to be coupled to a trailer includes a front mounting bracket assembly configured to be coupled to the trailer, and a rear mounting bracket assembly configured to be coupled to the trailer at a location spaced-apart from the front mounting racket assembly.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a side underride guard assembly configured to be coupled to a trailer is disclosed. The side underride guard assembly comprises a plurality of support subassemblies configured to be coupled to first and second longitudinal main beams of the trailer. Each support subassembly in the plurality of support subassemblies comprises at least one cross member having a first end configured to be adjacent a first longitudinal side edge of the trailer and an opposite second end configured to be adjacent an opposite second longitudinal side edge of the trailer. Each support subassembly also comprises at least one vertically oriented plate coupled to the at least one cross member. A first longitudinal guard member is configured to be coupled to the first end of each of the cross members of the plurality of support subassemblies. A second longitudinal guard member is configured to be coupled to the second end of each of the cross members of the plurality of support subassemblies. The first and second longitudinal guard members are located below the first and second longitudinal side edges of the trailer, respectively, so as to prevent or inhibit side underride.

According to another example of the present disclosure, a side underride guard assembly configured to be coupled to a trailer having a rear underride guard assembly is disclosed. The side underride guard assembly comprises a first cable or rod having a front end configured to be coupled to a first longitudinal guard member of the side underride guard assembly proximate a rear end thereof, and a rear end configured to be coupled to a first side of the rear underride guard assembly. The side underride guard assembly also includes a second cable or rod having a front end configured to be coupled to a second longitudinal guard member of the side underride guard assembly proximate a rear end thereof, and a rear end configured to be coupled to an opposite second side of the rear underride guard assembly. A first guide member is coupled to an outer side of the first longitudinal guard member and comprises a channel for receiving the first cable or rod therein. A second guide member is coupled to an outer side of the second longitudinal guard member and comprises a channel for receiving the second cable or rod therein.

BRIEF DESCRIPTION OF THE DRAWINGS

The present disclosure is described with reference to the following Figures. The same numbers are used throughout the Figures to reference like features and like components.

DETAILED DESCRIPTION

Figures 1A, 1B:
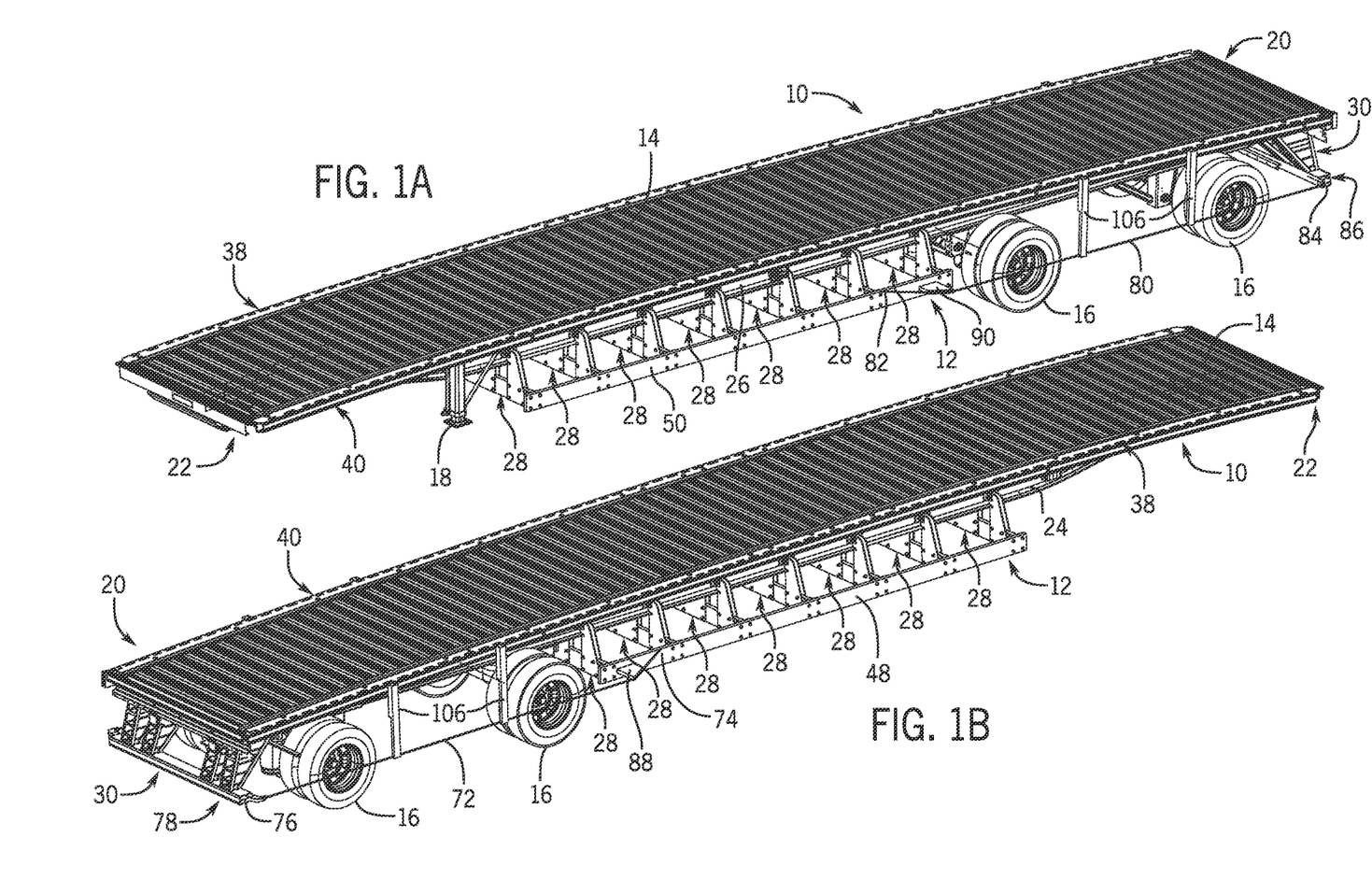
FIG. 1A is left perspective view of a trailer equipped with a side underride guard assembly according to the present disclosure.
FIG. 1B is right perspective view of the trailer of FIG. 1A.
Figure 4:
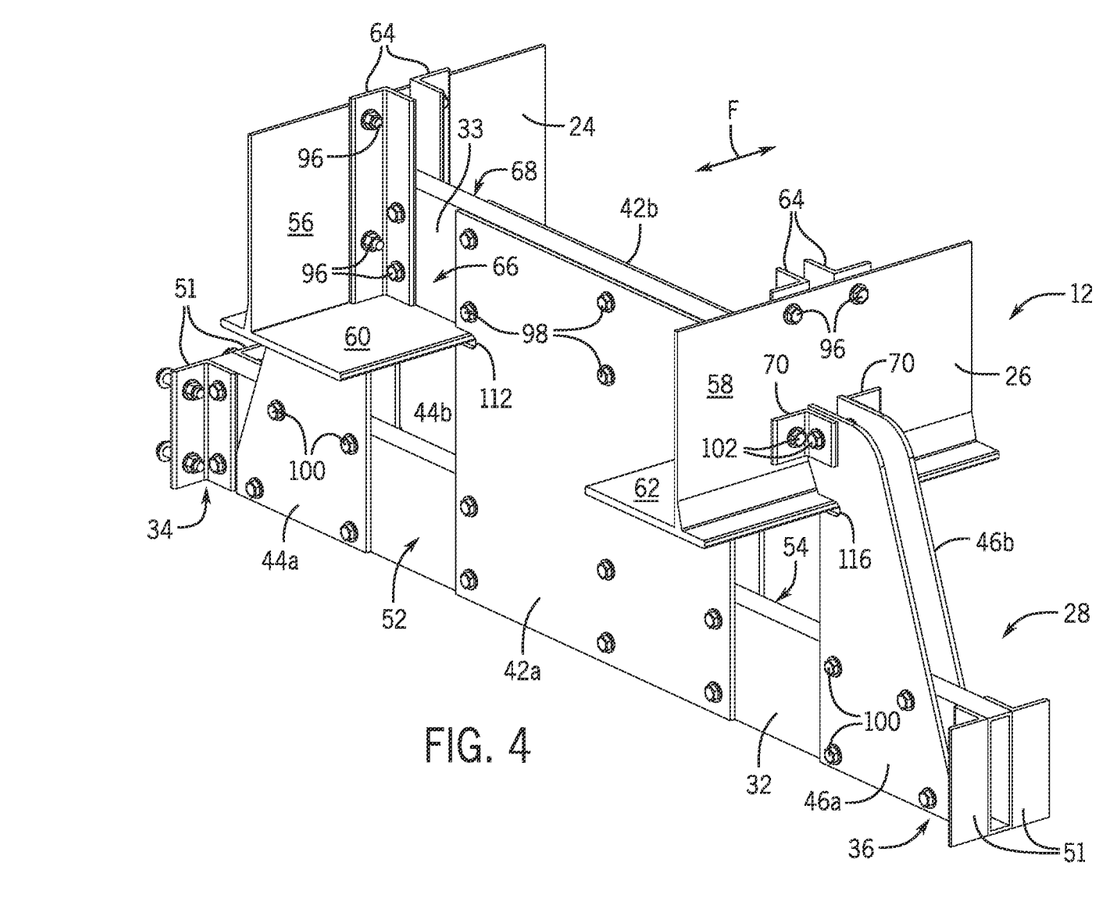
FIG. 4 is a perspective view of a support subassembly of the side underride guard assembly, connected to longitudinal main beams of the trailer.

FIGS. 1A and 1B show respective left perspective and right perspective views of a flatbed semi-trailer 10 with a side underride guard assembly 12 coupled to the trailer 10. The trailer 10 includes a deck 14, which is cambered (see FIG. 2) in order to allow the deck 14 to flex when loaded for purposes of weight distribution. The trailer 10 is supported by wheels 16 on axles proximate the rear end 20 of the trailer 10, and when not in use, by legs 18 proximate the front end 22 of the trailer 10. As is known, the front end 22 of the trailer 10 can be connected to a tractor (not shown). The deck 14 may have various designs, and may include a plurality of wooden and/or metal beams supported by a plurality of cross members or a plurality of aluminum cross members welded together (the latter of which is shown here). First and second longitudinal main beams 24, 26 support the deck 14. As is known, the longitudinal main beams 24, 26 may be generally I-shaped, generally T-shaped, or have another appropriate structural cross section. In the present example, the longitudinal main beams 24, 26 each have respective vertically oriented webs 56, 58 and horizontally oriented flanges 60, 62 (FIG. 4). A rear underride guard assembly 30 is coupled to the rear end 20 of the trailer 10.

Figure 3:
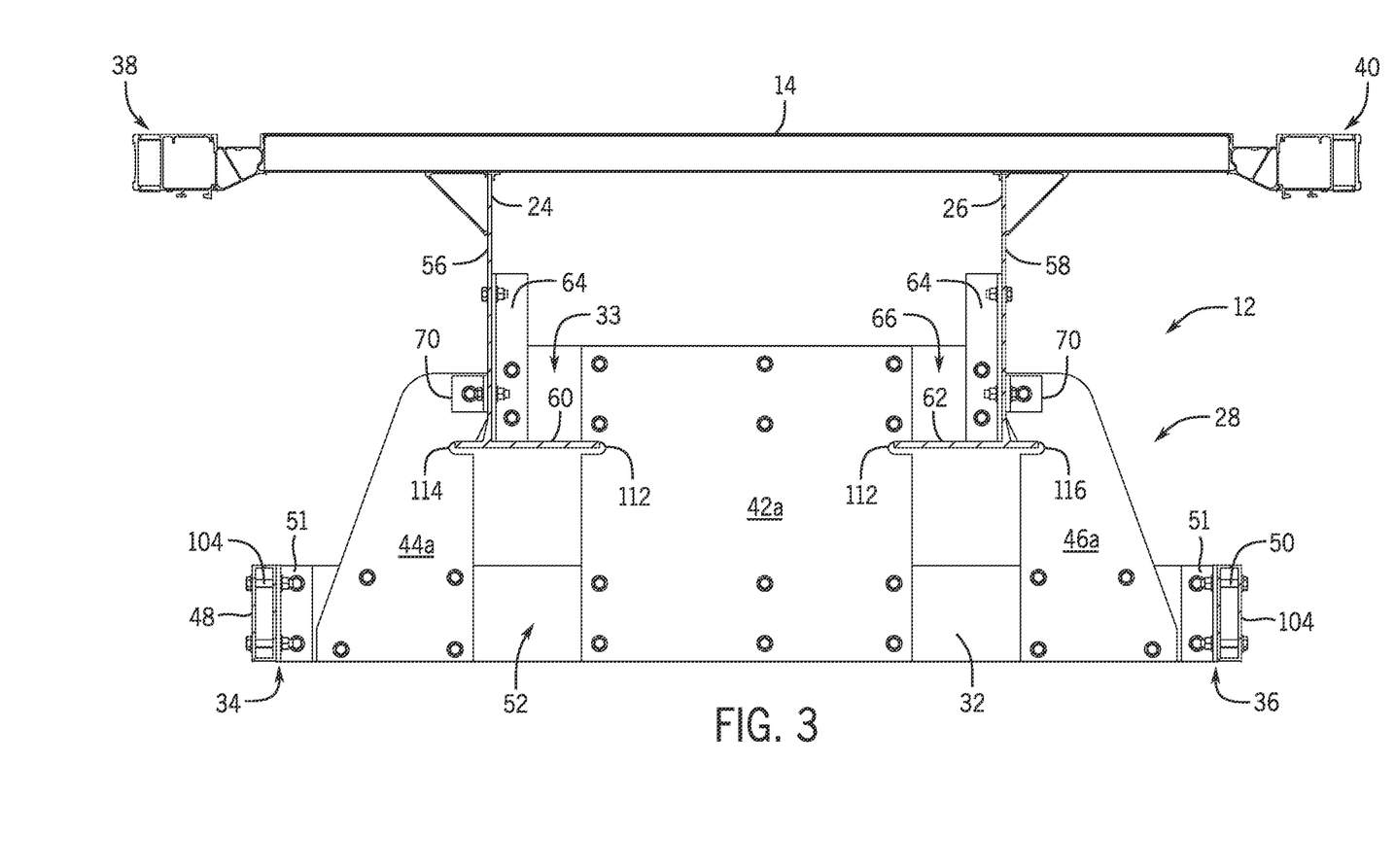
FIG. 3 is a cross sectional view taken along the line III-III in FIG. 2.

According to the present disclosure, the side underride guard assembly 12 includes a plurality of support subassemblies 28 coupled to the first and second longitudinal main beams 24, 26 of the trailer 10, as will be described further herein below. As shown in FIGS. 3 and 4, each support subassembly 28 in the plurality of support subassemblies 28 comprises at least one cross member 32, 33. The lower cross member 32 has a first end 34 adjacent a first longitudinal side edge 38 of the trailer 10 and an opposite second end 36 adjacent an opposite second longitudinal side edge 40 of the trailer 10. Each support subassembly 28 also includes at least one vertically oriented plate 42a, 42b, 44a, 44b, 46a, 46b coupled to the at least one cross member 32. As shown in FIG. 4, in the present example, the at least one vertically oriented plate 42a, 42b, 44a, 44b, 46a, 46b comprises first and second vertically oriented plates coupled to opposite front and rear sides 52, 54 of the at least one cross member 32. The vertically oriented plates 42a, 42b, 44a, 44b, 46a, 46b couple the at least one cross member 32 to at least one of the first and second longitudinal main beams 24, 26 of the trailer 10.

As shown in FIGS. 3 and 4, the side underride guard assembly 12 includes two cross members: the above-noted lower cross member 32 and an upper cross member 33. The upper cross member 33 is coupled between the respective webs 56, 58 of the first and second longitudinal main beams 24, 26 of the trailer 10. The upper cross member 33 is supported on upper surfaces of the flanges 60, 62 of the longitudinal main beams 24, 26 and is bolted to the webs 56, 58 thereof by way of vertically elongated L-shaped brackets 64, one L-shaped bracket on either side of the upper cross member 33. The lower cross member 32 is located below the first and second longitudinal main beams 24, 26 and is supported by at least one of the upper cross member 33 and the first and second longitudinal main beams 24, 26 by way of the at least one vertically oriented plate 42a, 42b, 44a, 44b, 46a, 46b. More specifically, a first pair of vertically oriented plates 42a, 42b have upper portions coupled to front and rear sides 66, 68 of the upper cross member 33 and lower portions coupled to the front and rear sides 52, 54 of the lower cross member 32 proximate the middle of the lower cross member 32. Such connections can be made, for example, by bolting. A second pair of vertically oriented plates 44a, 44b have upper portions coupled to the web 56 of the first longitudinal main beam 24 and lower portions coupled to the front and rear sides 52, 54 of the lower cross member 32 proximate the first end 34 thereof. A third pair of vertically oriented plates 46a, 46b have upper portions coupled to the web 58 of the second longitudinal main beam 26 and lower portions coupled to the front and rear sides 52, 54 of the lower cross member 32 proximate the second end 36 thereof. The upper portions of the second and third pairs of vertically oriented plates 44a, 44b, 46a, 46b are coupled to the webs 56, 58 of the longitudinal main beams 24, 26 by way of L-shaped brackets 70 and bolts, one L-shaped bracket 70 for each plate 44a, 44b and 46a, 46b. The lower portions of the second and third pairs of vertically oriented plates 44a, 44b, 46a, 46b are coupled directly to the cross member 32 by bolting.

In the example shown, the vertically oriented plates 42a, 42b are parallel to one another and situated one on each side 52, 54 of the lower cross member 32 and one on each side 66, 68 of the upper cross member 33, near the center portions of each of the lower and upper cross members 32, 33. The vertically oriented plates 44a, 44b are parallel to one another and are situated one on each side 52, 54 of the lower cross member 32 near its first end 34. The vertically oriented plates 46a, 46b are parallel to one another and are situated one on each side 52, 54 of the lower cross member 32 near its second end 36. In other examples, it is contemplated that only one vertically oriented plate could be used at each of the center portion, first end 34, and second end 36 of the lower cross member 32. Such plates could be thicker than the parallel pairs of plates shown herein in order to provide the same or similar strength to the overall assembly. In other examples, the plates 42a, 44a, 46a could be combined into a single first plate, and the plates 42b, 44b, 46b could be combined into a single second plate. It is also envisioned that the plates might be paired but not parallel to one another, such as if the cross members 32, 33 had different cross-sectional shapes that did not have parallel front and rear sides 52, 54 and 66, 68 as in the present example. Furthermore, more than three sets of two parallel plates each might be used, such as two or three pairs of plates replacing the plates 42a, 42b.

Figure 2:
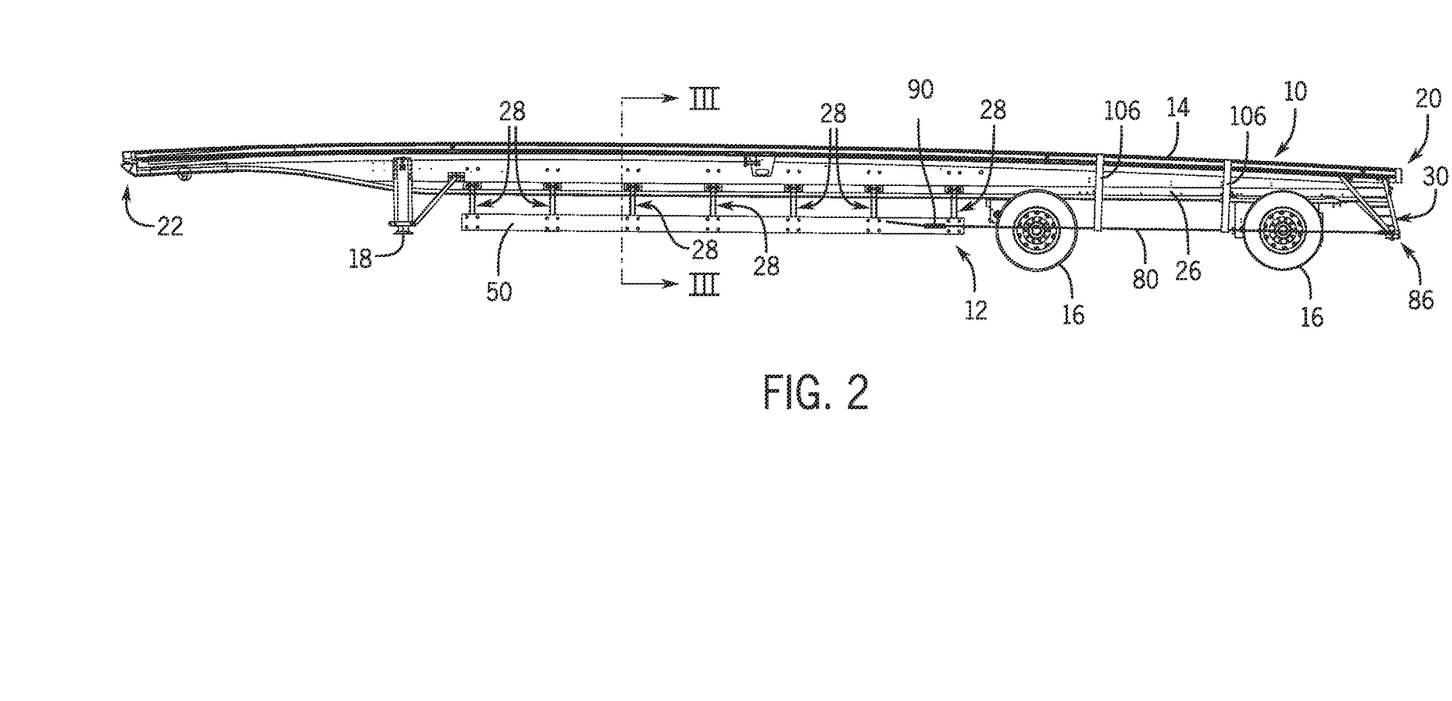
FIG. 2 is a left elevation view of the trailer of FIG. 1 A.

As shown in FIGS. 1A to 3, the side underride guard assembly 12 further includes a first longitudinal guard member 48 configured to be coupled to the first end 34 of each of the cross members 32 of the plurality of support subassemblies 28 and a second longitudinal guard member 50 configured to be coupled to the second end 36 of each of the cross members 32 of the plurality of support subassemblies 28. The first and second longitudinal guard members 48, 50 are bolted to the respective opposite ends 34, 36 of each cross member 32 by way of L-shaped brackets 51, one on each side 52, 54 of the lower cross member 32. As shown in FIGS. 1A, 1B, and 2, the first and second longitudinal guard members 48, 50 are located below the first and second longitudinal side edges 38, 40 of the trailer 10, respectively, so as to prevent or inhibit side underride in the event a vehicle collides with the side of trailer 10. As shown herein, the first and second longitudinal guard members 48, 50 comprise box beams. However, the first and second longitudinal guard members 48, 50 could instead be cylindrical beams, W-beam guardrails, or have another suitable structural shape. If the first and second longitudinal guard members 48, 50 have open cross-sections, they can be filled with foam to add strength, while remaining light-weight.

As shown in FIGS. 1A to 2, the side underride guard assembly 12 further comprises a first cable or rod 72 having a front end 74 coupled proximate a rear end of the first longitudinal guard member 48 and a rear end 76 coupled to a first side 78 of the rear underride guard assembly 30. A second cable or rod 80 has a front end 82 coupled proximate a rear end of the second longitudinal guard member 50 and a rear end 84 coupled to an opposite second side 86 of the rear underride guard assembly 30. The first and second cables/rods 72, 80 prevent or inhibit side underride between the wheels 16 of the trailer 10. In another example not shown here, multiple cables/rods are used on each side of the trailer 10 and are situated vertically with respect to one another to add resistance to a vehicle impacting the side of the trailer 10.

Figure 1C:
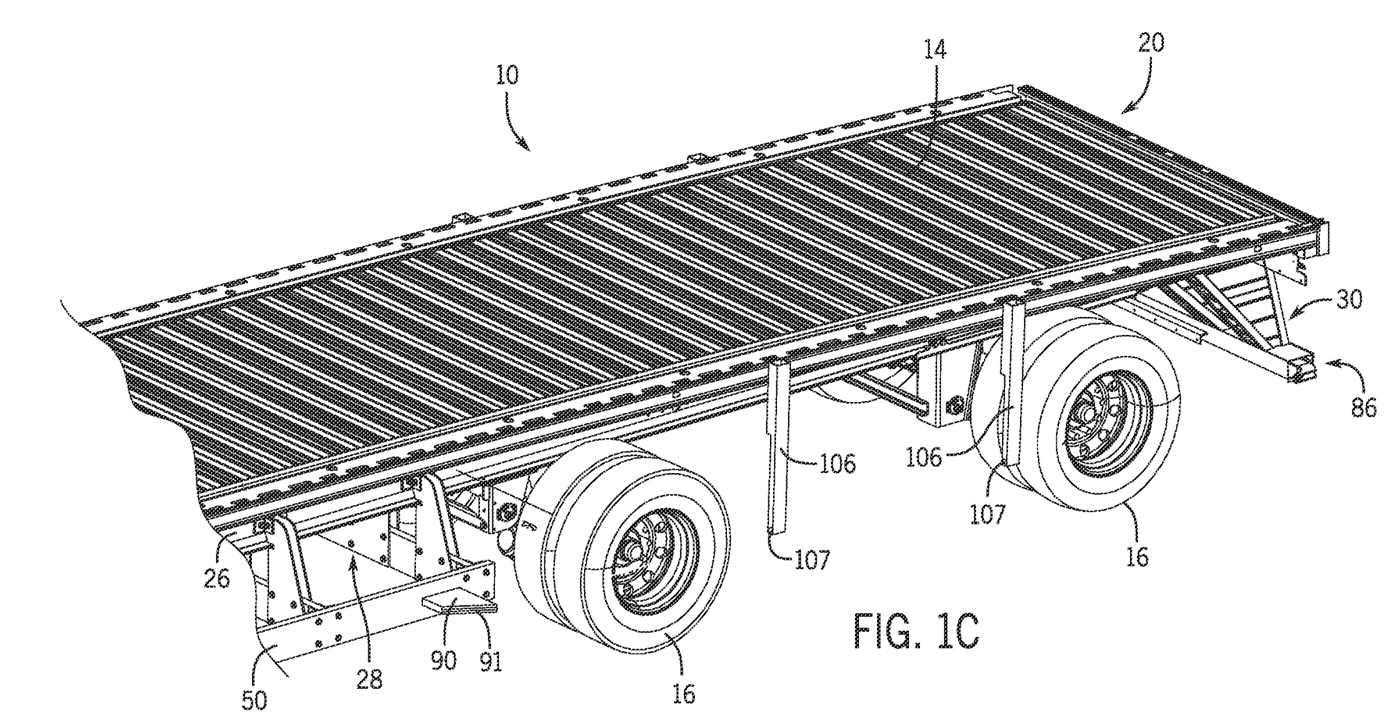
FIG. 1C is a close-up view of a portion of FIG. 1A, with a cable or rod of the side underride guard assembly removed.

In order to guide the cables/rods 72, 80 around the wheels 16, first and second guide members 88, 90 are provided. First guide member 88 is coupled to an outer side of the first longitudinal guard member 48 and comprises a channel for receiving the first cable or rod 72 therein. Second guide member 90 is coupled to an outer side of the second longitudinal guard member 50 and comprises a channel for receiving the second cable or rod 80 therein. The channels ensure that the cables/rods 72, 80 do not fall out of the guide members 88, 90. FIG. 1C shows a close-up view of the rear, left side of the trailer 10, with the cable/rod 80 removed. The channel 91 in the second guide member 90 can therefore be seen, and in this example the channel 91 is a groove formed in the angled outer surface of the guide member. Although not shown herein, a similar channel would be provided on the guide member 88 on the opposite side of the trailer 10. The channels could instead be defined by apertures extending through the guide members 88, 90 or by tube members attached to the outer surfaces of the guide members, instead of by grooves. If cables 72, 80 are used, then the cables 72, 80 can be taut enough that they remain in the channels without additional attachment being required. If rods 72, 80 are used, then the rods 72, 80 can be welded into the grooves or held therein with brackets, or the through-aperture or tube variations of the channels may be more appropriate. Similar grooves, apertures, or tubes may be used at the sides 78, 86 of the rear underride guard assembly 30 to hold the rear ends of the cables/rods 72, 80. Note that if rods 72, 80 are used, the guide members 88, 90 might have outer surfaces that are parallel to the outer surfaces of the longitudinal guard members 48, 50, instead of angled with respect thereto as shown herein. In that case, the front ends of the rods 72, 80 might be connected to the guide members 88, 90, instead of to the longitudinal guard members 48, 50, as rods might not bend as well as cables.

Figure 5A:
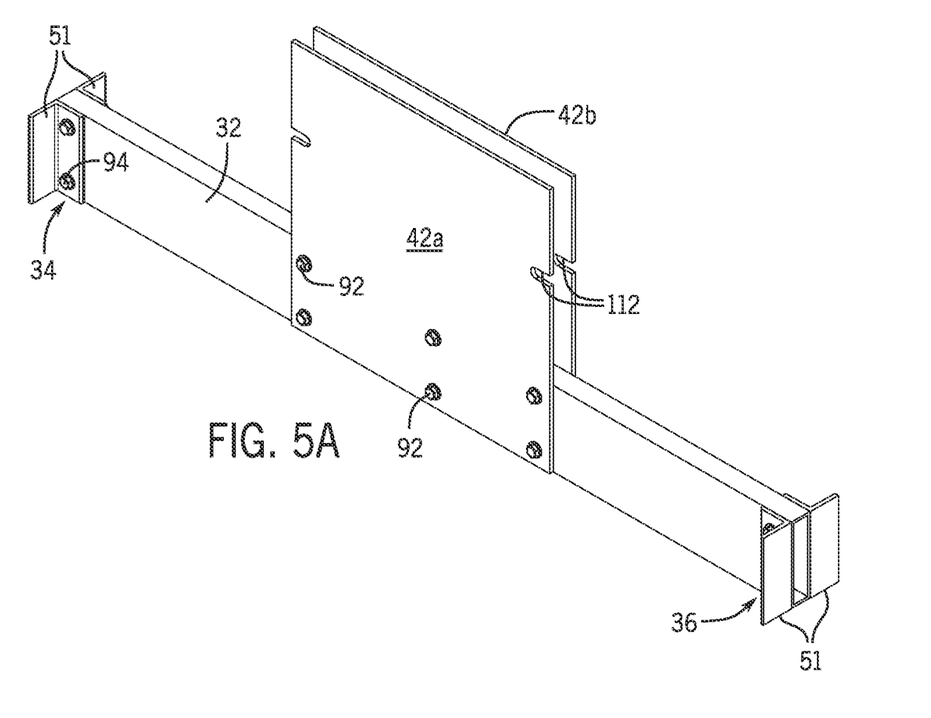
FIGS. 5A and 5B are perspective and elevation views, respectively, of portions of the support subassembly that can be pre-assembled.
Figure 5B:
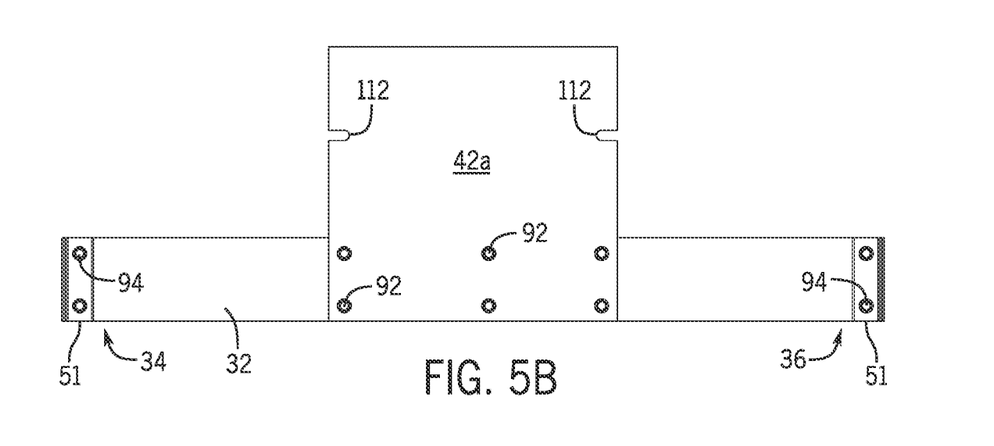
Figure 6:
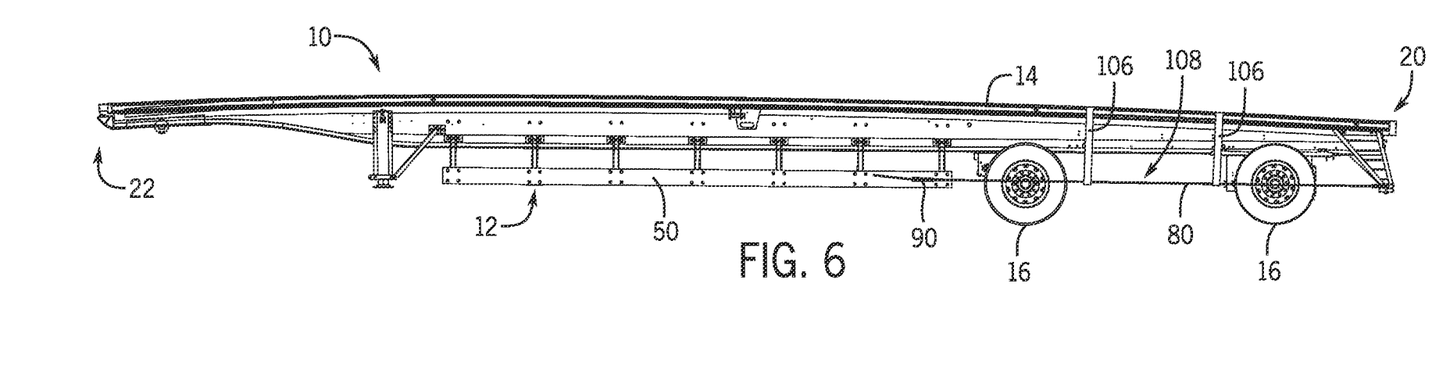
FIG. 6 is a view of the trailer like that in FIG. 2, with its axles in a "spread" configuration.

Next, installation of the side underride guard assembly 12 will be described. First, as shown in FIGS. 5A and 5B, parts of each support subassembly 28 can be pre-assembled. For example, plate 42a and plate 42b can be bolted by way of bolts (e.g., 92) to the middle portion of the cross member 32 on either side thereof. L-shaped brackets 51 can be bolted to the first and second ends 34, 36 of the cross member 32 by way of bolts (e.g., 94) on either side thereof. Meanwhile, referring to FIG. 4, the upper cross member 33 can be connected to the longitudinal main beams 24, 26 underneath the deck 14 of the trailer 10 by way of vertically elongated L-shaped brackets 64 and bolts 96. The lower surfaces of the upper cross member 33 and the L-shaped brackets 64 can rest on the upper surfaces of the flanges 60, 62, while the end/outer surfaces thereof abut the webs 56, 58. The subassembly shown in FIGS. 5A and 5B can then be brought below the installed upper cross member 33, with the plates 42a, 42b on the subassembly placed on either side 66, 68 of the cross member 33 and then connected thereto by way of bolts (e.g., 98). Pairs of plates 44a, 44b and 46a, 46b can then be installed by bolting (e.g., at 100) to the cross member 32 and then by bolting to the webs 56, 58 of the longitudinal main beams 24, 26 by way of brackets 70 (e.g., at bolts 102).

Once all support subassemblies 28 are installed on the longitudinal main beams 24, 26, the longitudinal guard members 48, 50 can be assembled to the respective ends 34, 36 of the cross members 32 by way of bolting (e.g., bolts 104 in FIG. 3) the longitudinal guard members 48, 50 to the outer faces of the L-shaped brackets 51. The guide members 88, 90 can be pre-assembled to the longitudinal guard members 48, 50 by way of welding or bolting, or bolted thereto after the longitudinal guard members 48, 50 are installed on the trailer 10. The cables/rods 72, 80 can then be installed onto the longitudinal guard members 48, 50 such as by way of hooks and eyes provided on the components to be connected, routed through the channels in the outer angled surfaces of the guide members 88, 90, and connected to the rear underride guard assembly 30 again by hooks and eyes. Support posts 106 (FIGS. 1A to 2) depending from the longitudinal side edges 38, 40 of the trailer 10 can provide extra guidance, support, and resistance to lateral movement to the cables/rods 72, 80. The support posts 106 can be welded and/or bolted to the outer longitudinal sides of the trailer 10 or can be supported by stake pockets formed along the sides of the trailer 10. Each support post 106 can have a hole 107 in its bottom, free end (FIG. 1C) through which the cable/rod 72, 80 is routed. In another example, tubes can be attached to the bottom ends of the support posts 106 to hold the cable/rods 72, 80. In addition to or instead of the support posts 106, brackets can be mounted on the suspension itself and attached to the cables/rods 72, 80 to keep the cables/rods 72, 80 from rubbing against other components and to reduce any movement of the cables/rods 72, 80 due to wind while the truck is driving.

Figure 7:
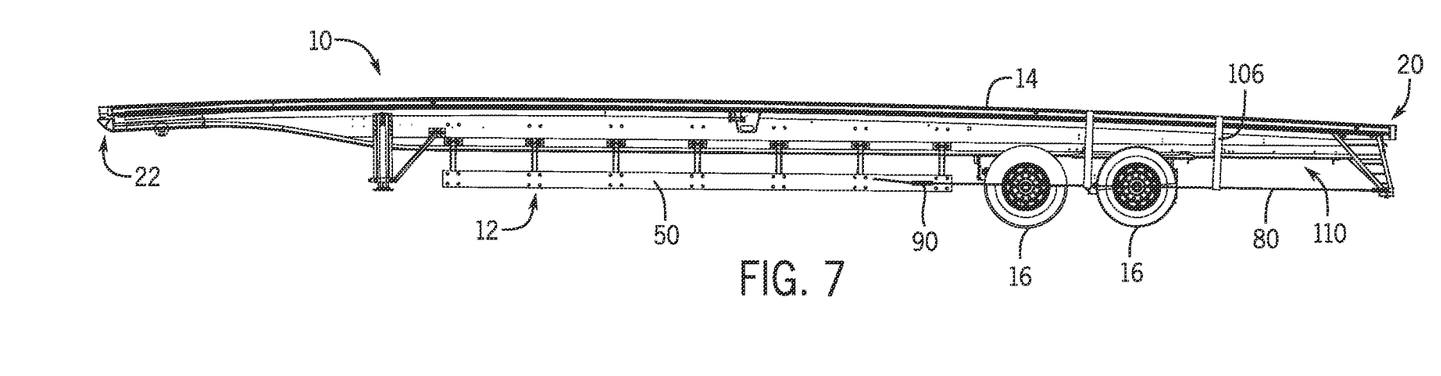
FIG. 7 is a view of the trailer of FIG. 6 with the axles in a closed configuration.

FIGS. 1A to 2 and FIG. 6 show the trailer 10 with the axles in a "spread" configuration, in which the frontmost and rearmost sets of wheels 16 are spread apart from one another. The cables/rods 72, 80 cover the gap 108 between the pairs of wheels 16 to prevent side underride in that area. In contrast, FIG. 7 shows the same trailer 10 in a "closed" configuration, in which the rearmost axle is situated closer to the frontmost axle. Very little gap exists between the pairs of wheels 16, but a larger gap 110 now exists between the rearmost wheel 16 and the rear end 20 of the trailer 10. This gap 110 is also covered by the cables/rods 72, 80 preventing side underride. The guide members 88, 90 that pull the cables/rods 72, 80 out away from and around the wheels 16 allow the rearmost axle to be repositioned without needing to remove or unhook this portion of the side underride assembly.

Figure 8:
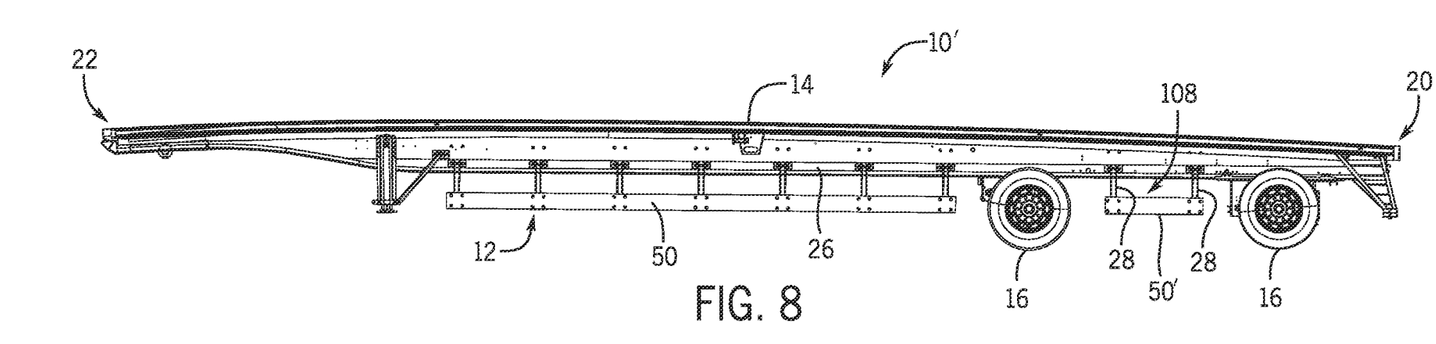
FIG. 8 is a view of another embodiment of a trailer with the axles in a fixed widespread configuration.
Figure 9:
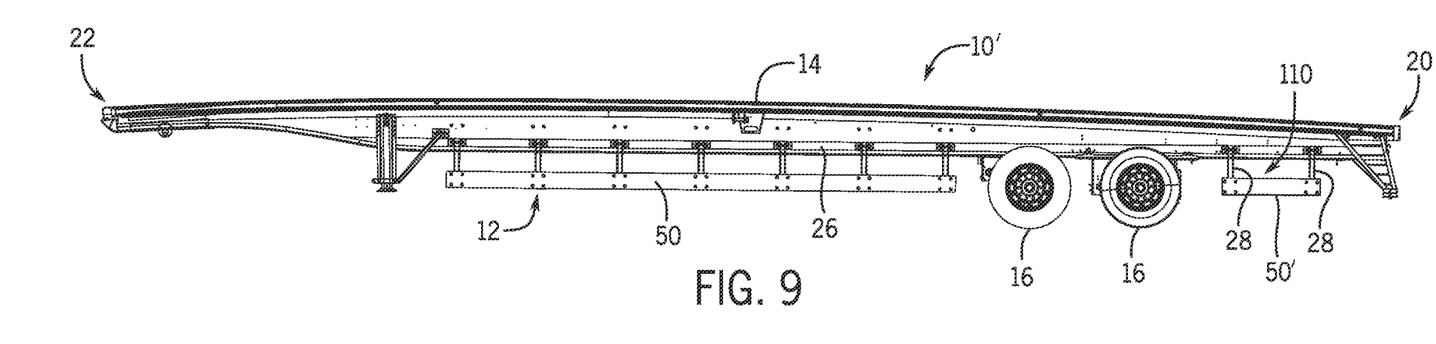
FIG. 9 is a view of another embodiment of a trailer with the axles in a fixed closed tandem configuration.

FIG. 8 shows another embodiment of a trailer 10', in which the positions of the axles (and thus the wheels 16) are fixed in a widespread configuration. In this embodiment, because the axles and wheels are at a fixed distance from one another, the gap 108 between the wheels 16 can be provided with a structure similar to that guarding the remainder of the trailer 10 from side underride. Specifically, two support subassemblies 28 are provided on the longitudinal main beams 24, 26 between the sets of wheels 16, and a longitudinal guard member 50' is connected thereto in the same manner as that described herein above. Similarly, in FIG. 9, the axles are situated in a fixed closed tandem configuration, and the gap 110 is protected by a longitudinal guard member 50' supported by two support subassemblies 28 located behind the rear wheels 16.

Most bolted connections shown herein are through-bolted, but separate bolts could be used for each plate or bracket in a pair of parallel plates or brackets instead. Some or all of the connections cold instead by made by screws, rivets, and/or welds. In the event that composites are used for any components, the connections could alternatively be made with adhesive. In still other examples, certain components shown here can instead be fabricated as one integral component. The exact shapes of the components are not limiting. For example, although the plates 42a and 42b are provided with notches 112 for receiving the flanges 60, 62 of the longitudinal main beams 24, 26, notches may not be required if the plates 42a, 42b are made narrower or if the flanges 60, 62 have different dimensions than shown here. The same is true for notches 114, 116 (FIGS. 3 and 4) in plates 44a, 44b and 46a, 46b, respectively, which receive the flanges on the outer-facing sides of the longitudinal main beams 24, 26.

Figure 10A:
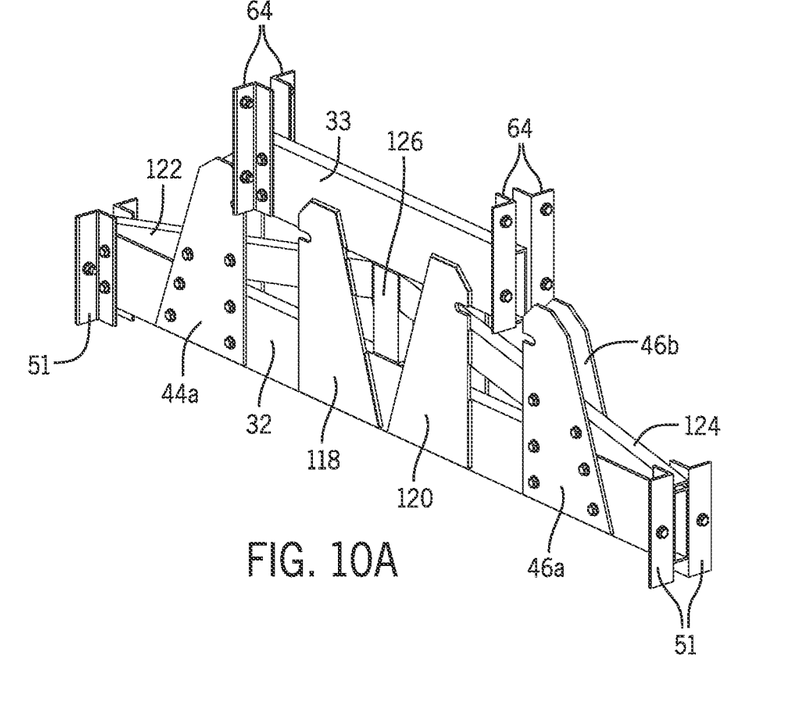
FIGS. 10A and 10B illustrate another embodiment of a support subassembly for the side underride guard assembly.
Figure 10B:
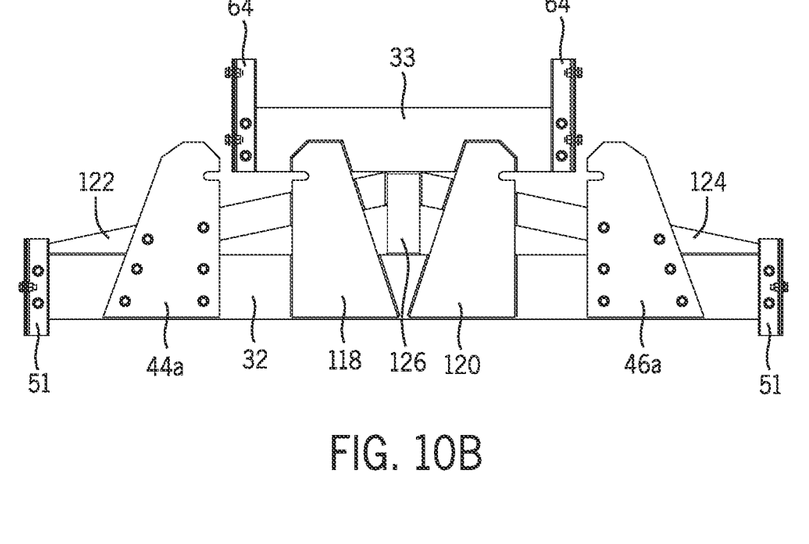

By way of another example, referring to FIGS. 10A and 10B, the vertically oriented plates 42a, 42b could be replaced by two pairs of plates 118, 120 on both sides of upper cross member 33 and lower cross member 32. Brace members 122 and 124 could be provided on the diagonal, connected at the middle by an upright member 126. Clearly, there are many ways to connect a support subassembly to the longitudinal main beams 24, 26 of a trailer 10 so as to absorb the force of a crash, while still allowing for flexure of the support subassembly.

In the example shown herein, the side underride guard assembly 12 is shown in use on a flatbed trailer 10, 10'. While the deck 14 is cambered (see FIG. 2), the support subassemblies 28 are connected to the longitudinal main beams 24, 26, which have relatively flat (i.e., non-cambered) lower flanges 60, 62. The present arrangement presents an advantage over connecting the supports for the longitudinal guard members 48, 50 to the cambered deck 14, as the longitudinal guard members 48, 50 could be prone to failure under repeated flex due to loading (flattening) and unloading (cambering) of the deck 14. In contrast, supporting the longitudinal guard members 48, 50 from the deck is not a problem with a van or reefer trailer, which does not have a cambered bed. The side underride guard assembly 12 could be used on any trailers with longitudinal main beams 24, 26, such as, but not limited to, tankers and container chassis.

The support subassembly 28 of the present disclosure is able to flex with the trailer 10 in the direction shown by the arrow F in FIG. 4 due to the inclusion of vertically oriented plates 42a, 42b, 44a, 44b, 46a, 46b coupled to the longitudinal main beams 24, 26. The plates 42a, 42b, 44a, 44b, 46a, 46b could be made of any material that is strong yet capable of flexing to some degree, such as aluminum, steel, or a polymer composite. The plates 42a, 42b, while being lightweight and able to flex in the direction of arrow F, are still strong enough to absorb the impact of a vehicle with the longitudinal guard members 48, 50 in a manner that prevents or inhibits side underride. The cross members 32, 33 can be made of aluminum, steel, or a polymer composite as well.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C.

As used herein, unless otherwise limited or defined, discussion of particular directions is provided by example only, with regard to particular embodiments or relevant illustrations. For example, discussion of "top," "bottom," "front," "back," "left," "right," "lateral," or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second," "third," etc. is not intended to connote priority or importance, but merely to distinguish one of several similar elements from another.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies and methods described herein may be used alone or in combination with other assemblies and methods. It is to be expected that various equivalents, alternatives and modifications are possible.

What is claimed is:

1. A side underride guard assembly configured to be coupled to a trailer, the side underride guard assembly comprising:

a plurality of support subassemblies configured to be coupled to first and second longitudinal main beams of the trailer, each support subassembly in the plurality of support subassemblies comprising:
   at least one cross member having a first end configured to be adjacent a first longitudinal side edge of the trailer and an opposite second end configured to be adjacent an opposite second longitudinal side edge of the trailer; and
   at least one vertically oriented plate coupled to the at least one cross member;
a first longitudinal guard member configured to be coupled to the first end of each of the cross members of the plurality of support subassemblies; and
a second longitudinal guard member configured to be coupled to the second end of each of the cross members of the plurality of support subassemblies;
wherein the first and second longitudinal guard members are located below the first and second longitudinal side edges of the trailer, respectively, so as to prevent side underride; and
wherein the at least one vertically oriented plate is coupled to a front or rear side of the at least one cross member and couples the at least one cross member to at least one of the first and second longitudinal main beams of the trailer.

2. The side underride guard assembly of claim 1, wherein the at least one vertically oriented plate comprises first and second vertically oriented plates coupled to the front and rear sides of the at least one cross member, respectively, the first and second vertically oriented plates coupling the at least one cross member to at least one of the first and second longitudinal main beams of the trailer.

3. A side underride guard assembly configured to be coupled to a trailer, the side underride guard assembly comprising:
a plurality of support subassemblies configured to be coupled to first and second longitudinal main beams of the trailer, each support subassembly in the plurality of support subassemblies comprising:
   at least one cross member having a first end configured to be adjacent a first longitudinal side edge of the trailer and an opposite second end configured to be adjacent an opposite second longitudinal side edge of the trailer; and
   at least one vertically oriented plate coupled to the at least one cross member;
a first longitudinal guard member configured to be coupled to the first end of each of the cross members of the plurality of support subassemblies; and
a second longitudinal guard member configured to be coupled to the second end of each of the cross members of the plurality of support subassemblies;
wherein the first and second longitudinal guard members are located below the first and second longitudinal side edges of the trailer, respectively, so as to prevent side underride; and
wherein the at least one cross member comprises:
   an upper cross member coupled between respective first and second webs of the first and second longitudinal main beams of the trailer; and
   a lower cross member located below the first and second longitudinal main beams and supported by at least one of the upper cross member and the first and second longitudinal main beams by way of the at least one vertically oriented plate.

4. The side underride guard assembly of claim 3, wherein the upper cross member has opposite ends that rest on top of horizontal flanges of the respective first and second longitudinal main beams of the trailer.

5. The side underride guard assembly of claim 3, wherein the trailer includes a rear underride guard assembly at a rear end of the trailer, and the side underride guard assembly further comprises:
a first cable or rod having a front end configured to be coupled to the first longitudinal guard member proximate a rear end of the first longitudinal guard member and having a rear end configured to be coupled to a first side of the rear underride guard assembly; and
a second cable or rod having a front end configured to be coupled to the second longitudinal guard member proximate a rear end of the second longitudinal guard member and having a rear end configured to be coupled to an opposite second side of the rear underride guard assembly.

6. The side underride guard assembly of claim 5, further comprising:
a first guide member coupled to an outer side of the first longitudinal guard member and comprising a channel for receiving the first cable or rod therein; and
a second guide member coupled to an outer side of the second longitudinal guard member and comprising a channel for receiving the second cable or rod therein.

7. The side underride guard of claim 5, wherein the first and second cables or rods remain stationary while an axle of the trailer moves from a closed position to a spread position, and vice versa.

8. The side underride guard assembly of claim 3,
wherein the at least one vertically oriented plate comprises:
   a first vertically oriented plate having an upper portion coupled to a front or rear side of the upper cross member and having a lower portion coupled to a front or rear side of the lower cross member proximate a middle of the lower cross member;
   a second vertically oriented plate having an upper portion coupled to the first web of the first longitudinal main beam and having a lower portion coupled to the front or rear side of the lower cross member proximate the first end thereof;
   a third vertically oriented plate having an upper portion coupled to the second web of the second longitudinal main beam and having a lower portion coupled to the front or rear side of the lower cross member proximate the second end thereof.

9. The side underride guard assembly of claim 3, wherein the first and second longitudinal guard members are one of the following: box beams, cylindrical beams, or W-beam guardrails.

10. A side underride guard assembly configured to be coupled to a trailer having a rear underride guard assembly, the side underride guard assembly comprising:
a first cable or rod having a front end configured to be coupled to a first longitudinal guard member of the side underride guard assembly proximate a rear end thereof, and a rear end configured to be coupled to a first side of the rear underride guard assembly;
a second cable or rod having a front end configured to be coupled to a second longitudinal guard member of the side underride guard assembly proximate a rear end thereof, and a rear end configured to be coupled to an opposite second side of the rear underride guard assembly;

a first guide member coupled to an outer side of the first longitudinal guard member and comprising a channel for receiving the first cable or rod therein;
a second guide member coupled to an outer side of the second longitudinal guard member and comprising a channel for receiving the second cable or rod therein; and
a plurality of support subassemblies configured to be coupled to first and second longitudinal main beams of the trailer, each support subassembly in the plurality of support subassemblies comprising:
at least one cross member having a first end configured to be adjacent a first longitudinal side edge of the trailer and an opposite second end configured to be adjacent an opposite second longitudinal side edge of the trailer; and
at least one vertically oriented plate coupled to the at least one cross member;
wherein the first longitudinal guard member is configured to be coupled to the first end of each of the cross members of the plurality of support subassemblies;
wherein the second longitudinal guard member is configured to be coupled to the second end of each of the cross members of the plurality of support subassemblies;
wherein the first and second longitudinal guard members are located below the first and second longitudinal side edges of the trailer, respectively, so as to prevent side underride; and
wherein the at least one vertically oriented plate is coupled to a front or rear side of the at least one cross member and couples the at least one cross member to at least one of the first and second longitudinal main beams of the trailer.

11. The side underride guard assembly of claim 10, wherein the at least one vertically oriented plate comprises first and second vertically oriented plates coupled to the front and rear sides of the at least one cross member, respectively, the first and second vertically oriented plates coupling the at least one cross member to at least one of the first and second longitudinal main beams of the trailer.

12. The side underride guard assembly of claim 10, wherein the at least one cross member comprises:
an upper cross member coupled between respective webs of the first and second longitudinal main beams of the trailer; and
a lower cross member located below the first and second longitudinal main beams and supported by at least one of the upper cross member and the first and second longitudinal main beams by way of the at least one vertically oriented plate.

13. The side underride guard assembly of claim 12, wherein the upper cross member has opposite ends that rest on top of horizontal flanges of the respective first and second longitudinal main beams of the trailer.

14. The side underride guard assembly of claim 10, wherein the at least one cross member comprises an upper cross member coupled between first and second webs of the respective first and second longitudinal main beams of the trailer, and a lower cross member located below the first and second longitudinal main beams; and
wherein the at least one vertically oriented plate comprises:
a first vertically oriented plate having an upper portion coupled to a front or rear side of the upper cross member and having a lower portion coupled to a front or rear side of the lower cross member proximate a middle of the lower cross member;
a second vertically oriented plate having an upper portion coupled to the first web of the first longitudinal main beam and having a lower portion coupled to the front or rear side of the lower cross member proximate the first end thereof;
a third vertically oriented plate having an upper portion coupled to the second web of the second longitudinal main beam and having a lower portion coupled to the front or rear side of the lower cross member proximate the second end thereof.

15. A side underride guard assembly configured to be coupled to a trailer having a rear underride guard assembly, the side underride guard assembly comprising:
a first cable or rod having a front end configured to be coupled to a first longitudinal guard member of the side underride guard assembly proximate a rear end thereof, and a rear end configured to be coupled to a first side of the rear underride guard assembly;
a second cable or rod having a front end configured to be coupled to a second longitudinal guard member of the side underride guard assembly proximate a rear end thereof, and a rear end configured to be coupled to an opposite second side of the rear underride guard assembly;
a first guide member coupled to an outer side of the first longitudinal guard member and comprising a channel for receiving the first cable or rod therein; and
a second guide member coupled to an outer side of the second longitudinal guard member and comprising a channel for receiving the second cable or rod therein;
wherein the first and second longitudinal guard members are one of the following: box beams, cylindrical beams, or W-beam guardrails.

16. A side underride guard assembly configured to be coupled to a trailer having a rear underride guard assembly, the side underride guard assembly comprising:
a first cable or rod having a front end configured to be coupled to a first longitudinal guard member of the side underride guard assembly proximate a rear end thereof, and a rear end configured to be coupled to a first side of the rear underride guard assembly;
a second cable or rod having a front end configured to be coupled to a second longitudinal guard member of the side underride guard assembly proximate a rear end thereof, and a rear end configured to be coupled to an opposite second side of the rear underride guard assembly;
a first guide member coupled to an outer side of the first longitudinal guard member and comprising a channel for receiving the first cable or rod therein; and
a second guide member coupled to an outer side of the second longitudinal guard member and comprising a channel for receiving the second cable or rod therein;
wherein the first and second cables or rods remain stationary while an axle of the trailer moves from a closed position to a spread position, and vice versa.

17. The side underride guard assembly of claim 16, further comprising first and second support posts configured to depend from opposite first and second longitudinal side edges of the trailer, the first and second support posts configured to support the respective first and second cables or rods.

* * * * *